United States Patent [19]

Nishihara

[11] Patent Number: 4,498,349
[45] Date of Patent: Feb. 12, 1985

[54] FRONT POWER TAKE-OFF FOR TRACTORS

[75] Inventor: Tadao Nishihara, Matsuyama, Japan

[73] Assignee: Iseki & Co., Ltd., Matsuyama, Japan

[21] Appl. No.: 417,332

[22] Filed: Sep. 13, 1982

[51] Int. Cl.³ .................. F16H 37/00; B60K 17/28; B60K 25/00

[52] U.S. Cl. .................. 74/5.2; 74/15.66; 74/15.6; 74/15.8; 74/15.82; 180/53.7; 180/53.6

[58] Field of Search .......... 74/15.2, 15.4, 15.6, 74/15.63, 15.66, 15.69, 15.8, 15.82, 15.84, 15.86, 15.88; 180/53.1, 53.4, 53.5, 53.61, 53.62, 53.6, 53.7, 53.8, 53.2, 53.3

[56] References Cited

U.S. PATENT DOCUMENTS

| | | | |
|---|---|---|---|
| 3,733,912 | 5/1973 | Murayama et al. | 74/15.4 |
| 3,982,599 | 9/1976 | Herscovici et al. | 74/740 |
| 4,019,598 | 4/1977 | Fresmann et al. | 74/740 |
| 4,033,197 | 7/1977 | Shikiya et al. | 74/344 |
| 4,292,855 | 10/1981 | Murayama | 74/15.4 |
| 4,351,196 | 9/1982 | Yoshida et al. | 74/15.86 |

FOREIGN PATENT DOCUMENTS

| | | | |
|---|---|---|---|
| 2388712 | 11/1978 | France | 180/53.1 |
| 66232 | 6/1977 | Japan | 180/53.1 |

Primary Examiner—Lawrence J. Staab
Assistant Examiner—Michael David Bednarek
Attorney, Agent, or Firm—Arthur T. Fattibene

[57] ABSTRACT

A front power take-off for tractors. A drive pinion shaft provided in a differential mechanism for driving the front wheels is positioned in the center of pivotal movements of a front axle housing a front working power out-put shaft and a front wheel drive power input shaft for driving a drive pinion are disposed so that the axes of these power shafts are under and on the right and left sides of the drive pinion shaft, and two transmission shafts disposed in right and left portions of a lower section of a transmission case connect drive mechanisms provided in said right and left portions of the lower section of the transmission case to the power shafts. The rotary power taken out from the transmission case is transmitted by the transmission shafts to their respective front power take-off portions at a high speed without these shafts vibrating. Drive gear mechanisms for rotating the front working power output shaft and front wheel drive power input shaft are provided in a drive gear case in such a manner that these drive gear mechanisms overlap each other in the longitudinal direction and are spaced far from each other in the lateral direction to allow the drive gear case to be disposed in a position high enough that the drive gear case does not collide with a ridge between rice fields when the tractor is moved over the ridge.

4 Claims, 6 Drawing Figures

FRONT POWER TAKE-OFF FOR TRACTORS

BACKGROUND OF THE INVENTION

1. Field of the Invention

This invention relates to a front power take-off in which the front wheels of a tractor are driven by rotary power taken out from two portions of a section in the vicinity of a lower section of the tractor transmission case, and transmitting power to a front power take-off shaft for driving an auxiliary machine.

2. Description of the Prior Art

The conventional take-off means for such front wheel driving power and front auxiliary machine driving power is so formed that the rotary power for a front wheel driving power take-off shaft and a front working power take off driving shaft, which project from and are pivotably supported on a lower portion of the transmission case, is transmitted via universal joint shafts to a front wheel-driving differential mechanism and a front auxiliary machine. In this take-off means, the transmission mechanism can be constructed simply but the universal joint shafts are not supported firmly. This admits the problem that the universal joint shafts vibrate greatly when they are rotated, and so they cannot be rotated at a high speed, nor can a high torque be transmitted. These universal joint shafts are provided projecting from a lower portion of the transmission case, and a driving gear case containing therein two pairs of gear mechanisms for transmitting the rotary power of the universal joint shafts to the differential mechanism driving the front wheels and the front working power take-off drive shaft are generally positioned below the lower portion of the transmission case, reducing, the clearance of the tractor body over the ground. Consequently, when the tractor is driven over a ridge between rice fields, these projecting parts sometimes collide with the ridge. Thus, the conventional front power take-off has problems with respect to the movement of the tractor as well.

SUMMARY OF THE INVENTION

An object of the present invention is to provide a front power take-off for tractors free from the above defects. In the construction according to the present invention a drive pinion shaft is provided in the differential mechanism for driving the front wheels, at a position in the portion of a front axle housing corresponding to the center of its vertical pivotal movements. A front working power output shaft and a front wheel-driving power input shaft used to drive the drive pinion are disposed such that the axes of these power shafts are positioned under and on the right and left or opposite sides of the drive pinion shaft. Two transmission shafts are disposed in the right and left portions of the lower section of the transmission case and connect driving mechanisms provided in said right and left portions of the lower section of the transmission case to the mentioned power shafts. The rotary power taken out from the transmission case is transmitted by ordinary transmission shafts to their respective front power take-off portions at a high speed, with a laterally balanced rotational force, and no deflection of the axes thereof. The front power take-off is provided in a drive gear case with drive gear mechanisms for the front wheels and a front auxiliary machine. These drive gear mechanisms extend overlapping one another in the longitudinal direction in positions sufficiently away from the ground surface in such a manner that the axes of these drive gear mechanisms are spaced sufficiently far from each other in the lateral direction to thereby allow the drive gear case to be positioned sufficiently high as compared with the drive gear case in the conventional front power take-off of this kind, so the tractor can be moved over a ridge between rice fields without the case colliding with the ridge.

The above and other objects as well as advantageous features of the invention will become apparent from the following description of the preferred embodiments taken in conjunction with the accompanying drawings.

BRIEF DESCRIPTION OF THE DRAWINGS

The accompanying drawings show embodiments of the present invention, wherein.

DESCRIPTION OF THE PREFERRED EMBODIMENTS

Figure 1:
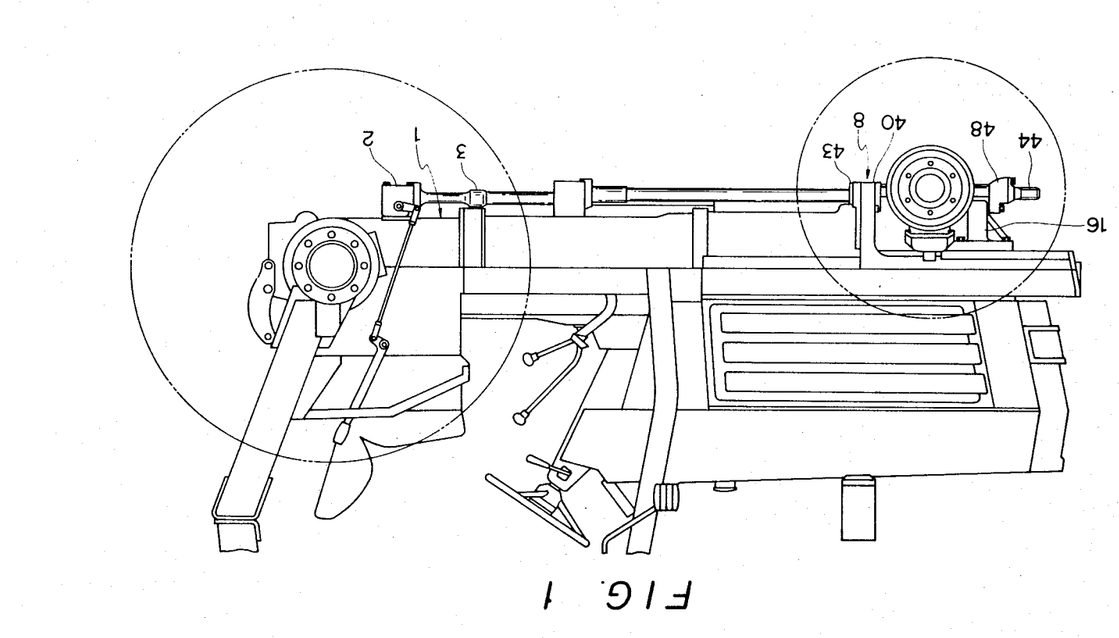
FIG. 1 is a side elevational view of a tractor.
Figure 2:
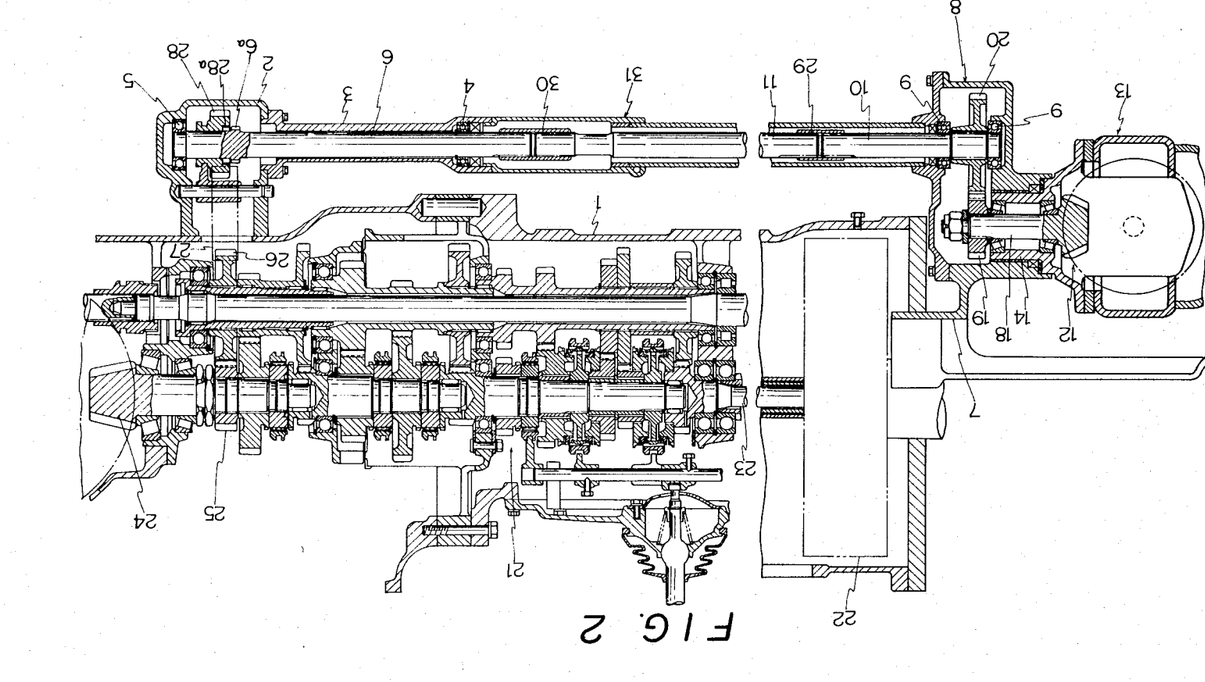
FIG. 2 is an unfolded sectional view taken along the line A-B-C in FIG. 5.

An embodiment of the present invention will be described with reference to the drawings. A power take-off case 2 is mounted to, for example, the rear, right portion of a lower surface of a transmission case 1 as shown in FIG. 2. A front wheel drive power take-off shaft 6 is supported in a bearing 5 provided in the power take-off case 2 and a bearing 4 provided in a bearing cylinder 3 secured to the power take-off case 2 so as to project forward therefrom.

A drive gear case 8 is provided at a lower portion of the front frame 7 of the tractor. The rear portion of the front wheel drive power input shaft 10, which is supported in the drive gear case 8 via bearings 9, and the front portion of the front wheel drive power take-off shaft 6 are connected together via a transmission shaft 11.

A rear pivot 14 of a front gear case 13, in which a differential mechanism 12 for driving the front wheels is provided, is rotatably supported on the front frame 7, and a front pivot 15 thereof on a front pivot bearing 16 secured to the front frame 7. A front axle housing 17 is fixed to the ront gear case 13 and extends to the right and left therefrom, and is provided therein with right and left front shafts rotatably supported therein. This front axle housing 17 is so formed that right and left portions of the housing 17 can be moved pivotally in the vertical direction about the axes of the front and rear pivots 15, 14. A drive pinion shaft 18 in the differential mechanism 12 for driving the front wheels is supported concentrically with the rear pivot 14. The axis of the front wheel drive power take-off shaft 6, i.e. front wheel drive power input shaft 10, is positioned on the lower right side of the drive pinion shaft 18 (refer to FIG. 5). A gear 19 is mounted on the drive pinion shaft 18 extending into the drive gear case 8. The gear 19 is meshed with a gear 20 mounted on the front wheel drive power input shaft 10. The front wheel drive power take-off shaft 6 is driven by gear change mechanism 21 provided in the transmission case 1. The engine output is transmitted to an input shaft 23 via a clutch 22, and the rotation of the input shaft 23 to a rear wheel-driving rear drive pinion shaft 24 by the gear change mechanism 21. The rotation of a gear 25 mounted on the rear drive pinion shaft 24 is transmitted to a clutch gear 28, which is mounted loosely on the front wheel drive power take-off shaft 6 via counter gears 26, 27 to allow clutch teeth 28a on the clutch gear 28 to engage with and disengage from clutch teeth 6a provided on the front wheel drive power take-off shaft 6.

Reference numerals 29, 30 denote shaft couplings, and 31 represents an extensible shaft cover.

Figure 3:
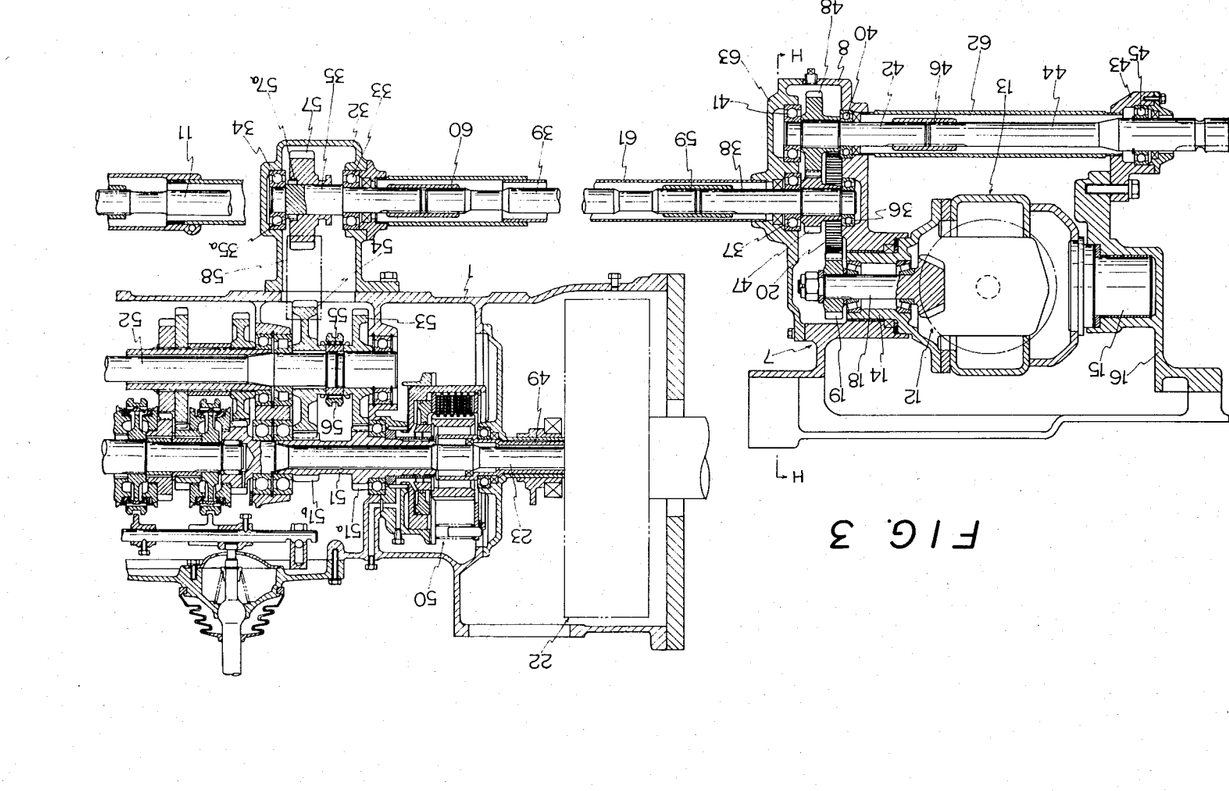
FIG. 3 is an unfolded sectional view taken along the line A-B-G-D-E in FIG. 5.
Figure 5:
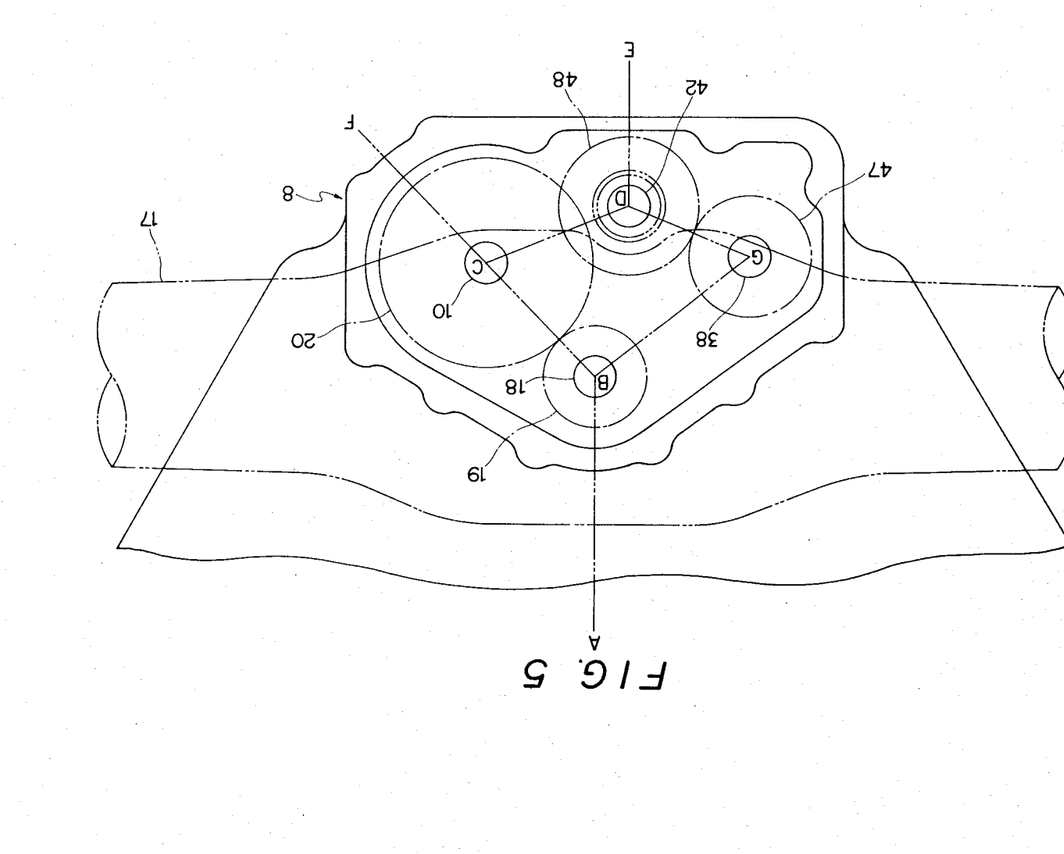
FIG. 5 is a sectional view taken along the arrow line H—H in FIG. 3.

A power take-off case 32 is secured to, for example, the left lower surface of the transmission case 1 in front of the power take-off case 2, as shown in FIG. 3. The front portion of a front working power take-off drive shaft 35 is supported on bearings 33, 34 and extends forward from the power take-off case 32. The rear portion of a front working power input shaft 38 supported in the drive gear case 8 via bearings 36, 37 is connected to the front portion of the front working power take-off drive shaft 35 via a transmission shaft 39. As shown in FIG. 5, the axes of the front working power input shaft 38 and front wheel drive power input shaft 10 are spaced far from each other in the lateral direction. Moreover, the position of the axis of the front working power input shaft 38 is under and on the left side of the drive pinion shaft 18, and spaced as close as possible to the same shaft 18.

Figure 4:
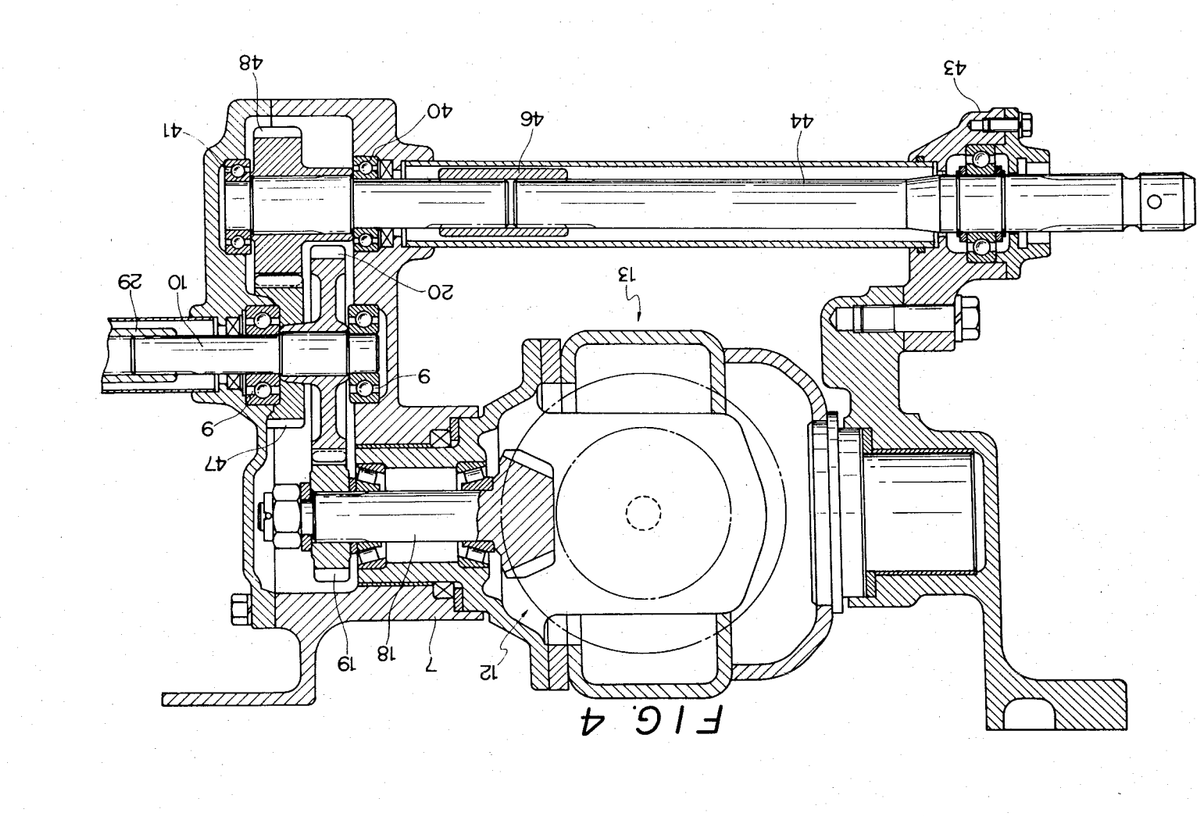
FIG. 4 is an unfolded sectional view of taken along the line A-B-C-D-E in FIG. 5.

The front portion of a front working power output shaft 42 is supported in the drive gear case 8 via bearings 40, 41 and positioned under the front gear case 14. A bearing unit 43 is secured to the front pivot receiver 16. A front working power take-off shaft 44 is positioned under the front gear case 14 and supported on the bearing unit 43 via a bearing 45. The front working power take-off shaft 44 and front working power output shaft 42 are connected together by a shaft coupler 46. A gear 47 mounted on the front working power input shaft 38 and a gear 48 mounted on the front working power output shaft 42 are meshed with each other. The gear 48 is positioned so as to overlap, in a front or rear elevational view thereof as shown in FIG. 5, the gear 20 mounted on the front wheel drive power input shaft 10, and so as to be staggered from each other in the longitudinal direction in a side elevational view thereof as shown in FIG. 4. The front working power output shaft 42 is disposed so that the axis of shaft 42 is in the highest possible position, which is moreover under the center of pivotal movements of the front axle housing 17 and spaced as close as possible to the axis of drive pinion shaft 18. The rotation of a power take-off input shaft 49, which is driven by the engine, is so controlled that its rotation is transmitted to a counter shaft 51 via a PTO clutch 50, or not transmitted thereto. Change gears 53, 54 are mounted loosely on a rear working power take-off shaft 52, and teeth 51a, 51b provided on the counter shaft 51 are constantly meshed with change gears 53, 54, respectively. A slide coupling 56 is engaged with clutch teeth of a hub 55 mounted on the rear working power take-off shaft 52, can be moved in the axial direction only, and can be engaged with and disengaged from the clutch teeth of change gear 53 or 54.

A clutch gear 57 mounted loosely on the front working power take-off drive shaft 35 is constantly meshed with change gear 54 via a counter gear 58 supported via a shaft in the power take-off case 32 so as to allow clutch teeth 57a of the clutch gear 57 to engaged with and disengage from the clutch teeth 35a provided on the front working power take-off drive shaft 35.

Reference numerals 59, 60 denote shaft couplings, 61 denotes an extensible shaft cover, 62 a shaft cover, and 63 a cover for the drive gear case 8.

Figure 6:
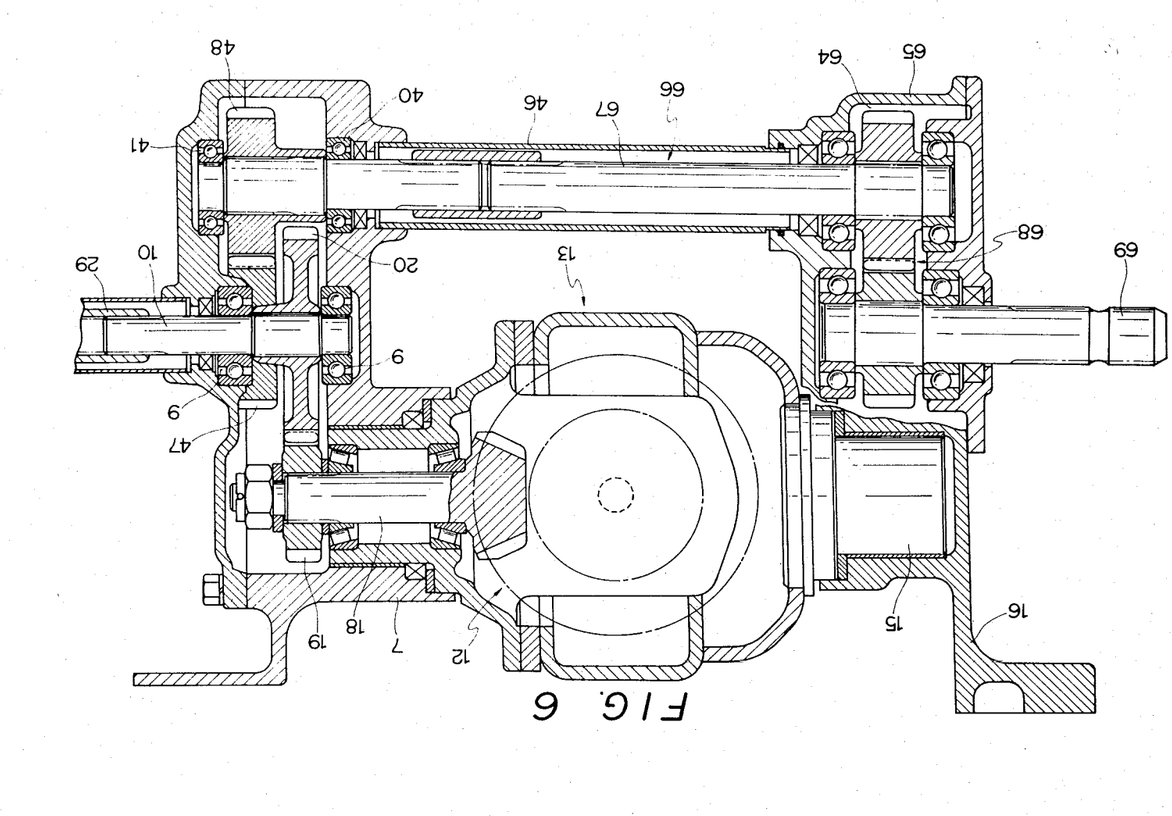
FIG. 6 is a side elevational view in longitudinal section of another example of the bearing unit shown in FIG. 4.

In a second embodiment shown in FIG. 6, a bearing unit 65 provided with a gear chamber 64 is used instead of the bearing unit 43 referred to previously. A front working power take-off shaft 66 is divided into a front working power take-off lower shaft 67, which is supported at the front portion thereof on the bearing unit 65 and connected at the rear end portion thereof to the output shaft 42, and a front working power take-off upper shaft 69, which is supported on the bearing unit 65 so as to be operatively connected to the front working power take-off lower shaft 67 via a gear mechanism 68. Accordingly, when gears in the gear mechanism 68 are replaced with other ones, the rotational speed of the front working power take-off upper shaft 69 can be changed.

Either the front wheel drive power take-off shaft 6 or the front working power take-off drive shaft 35 may be disposed on the right or left side of the drive pinion shaft 18.

Therefore, when the slide coupling 56 is moved forward so as to engage with the change gear 53, the rear working power take-off shaft 52 is rotated at high speed by the rotary power transmitted to the counter shaft 51 via the PTO clutch 50. Conversely, when the slide coupling 56 is moved backward to engage with the change gear 54, the rear working power take-off shaft 52 is rotated at low speed.

On the other hand, when the PTO clutch 50 is in the connecting state, the clutch gear 57 is driven constantly by the change gear 54 and counter gear 58. Accordingly, when the clutch teeth 57a of the clutch gear 57 are brought into engagement with the clutch teeth 35a of the front working power take-off drive shaft 35 as shown in FIG. 3, the rotary power is output from the front working power take-off shaft 44 or 67. When the clutch gear 57 is moved to a position in which the clutch teeth 57a are disengaged from the clutch teeth 35a, the front working power take-off shaft 44 or 67 remains stopped.

The front power take-off for tractors according to the present invention comprises a rear pivot (14) of the front axel housing (17) which is supported by the drive gear case (8) which is formed as a body to the front frame (7). A drive pinion shaft (18) is connected to a differential mechanism (12) for driving the front wheel and which drive pinion shaft projects from said rear pivot (14). The front wheel drive power input shaft (10) and the front working power input shaft (38) are disposed on opposite sides of the lower portion of the drive pinion shaft (18), and the front working power output shaft (42) being disposed between the input shafts (10) and (38). Respective drive gear mechanisms are provided with the front working power output shaft (42) and the front working power input shaft (38), and they are between the drive pinion shaft (18) and the front wheel drive power input shaft (10) with the drive mechanisms disposed to both sides of the lower portion of the transmission case (1) and each input shaft (10) and (38) being connected with respective transmission shafts disposed at both sides of the lower portion of the transmission case (1) so as to make the length of the lower portion of the drive gear case (8) less than the width of the drive gear case (8) to result in greater rigidity and strength and to better support the front axle housing (17) more firmly. This makes it possible to provide for a drive mechanism at both sides of the lower portion of the transmission case (1) with respective transmission shafts connected to each of said input shafts (10) and (38) which are disposed close to the transmission case (1). In the embodiments described above, a drive gear mechanism consisting of, for example, gears 47 and 48, for rotating the front working power output shaft 42 by a front working power input shaft 38 disposed in the preceding position in the power train, and a drive gear mechanism consisting of, for example, gears 19 and 20, for rotating the drive pinion shaft 18 by the front wheel drive power input shaft 10 disposed in the preceding position in the power train, are provided in one drive gear case 8. This allows the dimensions of the drive gear case 8, which contains these two driving gear mechanisms together and which constitutes the lowest part of the tractor body, to be minimized. Accordingly, there is little possibility that the drive gear case 8 will collide with plants growing on the ground. In the embodiment, in which the axes of the front working power input shaft 38 and front wheel drive power input shaft 10, which are supported in the gear case 8, are spaced far from each other in the lateral direction, and in which the axis of the front working power output shaft 42 is spaced as close as possible to the drive pinion shaft 18, the front working power output shaft 42, i.e. the lowest shaft among the mentioned shafts, can be disposed in a sufficiently high position. Therefore, there is no possibility that the front working power output shaft 42 will collide with a ridge between rice fields.

In the embodiment, in which the front wheel drive power input shaft 10 and front working power output shaft 42 are positioned in such a manner that the gears mounted fixedly thereon overlap each other in a front elevational view thereof and are staggered from each other in the longitudinal direction in a side elevational view thereof with the axis of the front working power output shaft 42 set close to that of the drive pinion shaft 18, the front working power output shaft 42 can be put sufficiently close to the front wheel drive power input shaft 10. Moreover, the front working power output shaft 42 can be provided in a position close to and just under the drive pinion shaft 18, which is in the center of rotation of the front wheels. Consequently, the front working power output shaft 42 is raised to a sufficiently high position, so that the minimum height of the tractor body above the ground surface is increased to preclude the possibility that these shafts will collide with a ridge between rice fields when the tractor is driven over it.

The front working power output shaft 42 can be supported in a position in which the axis of this shaft 42 is close to that of the drive pinion shaft 18 disposed in the center of pivotal movements of the front axle housing 17 without being obstructed by the gear 20 mounted on the front wheel-drive power input shaft 10. Therefore, variations in the bending angle of a universal joint portion of a universal joint shaft, which connects the front working power output shaft 42 (front working power take-off shaft 44 connected thereto in the embodiments) disposed close to the drive pinion shaft 18 which stays in the same position during pivotal movements of the front axle housing 17 to a driving shaft of an auxiliary machine (not shown), when the tractor moves can be minimized. Owing to the successful reduction of variations in the bending angle of the universal joint portion, the rotary power can be transmitted from the universal joint shaft to the auxiliary machine efficiently and smoothly with little noise.

In the embodiment in which the front working power take-off shaft 44 connected to a front portion of the front working power output shaft 42 is supported in a position close to and under the front axle housing 17, it is very convenient to use the front working power take-off shaft 44, supported sufficiently low above the ground surface, to drive an input shaft, which is disposed close to the ground surface, of a ground treating machine connected to a front portion of the tractor.

In the embodiment in which the working power is taken-off by the front working power take-off upper shaft 69 provided in a position which is higher than the front working power take-off shaft 44 via the front drive gear mechanism, an auxiliary machine can be conveniently driven with the front working power take-off upper shaft 69 supported in a suitably high position.

The present invention is of course not limited to the above embodiment and may be modified in various ways within the scope of the appended claims.

What is claimed is:

1. For use in a tractor type vehicle, an improved front power take off device comprising a transversely extending front axle housing (17), a front gear case (13), and an associated drive gear case (8), said front gear case being rotatably supported to said front axle housing (17), said front gear case (13) having a pivoted end (14) supported by said drive gear case (8), a differential mechanism (12) disposed in said front gear case (13) and having an associated drive pinion shaft (18) projecting from said pivoted end (14) into said drive gear case (8), a front wheel drive power input shaft (10) laterally disposed to one side of said drive pinion shaft (18), a front working power input shaft (38) laterally disposed to the other side of said drive pinion shaft (18), and a front working power output shaft (42) disposed between said front wheel drive power input shaft (10) and said front wheel working power input shaft, means (19, 20) for drivingly connecting said front wheel drive power input shaft (10) to said drive pinion shaft (18), and means (47, 48) for drivingly connecting said front working power input shaft (38) to said front working power output shaft (42), a transmission means, said transmission means including a front wheel power take-off shaft (6) co-axially disposed relative to said front wheel drive power input shaft, and a front working power take-off drive shaft (35) co-axially disposed relative to said front working power input shaft (38), a first transmission shaft means (11) co-axially interconnecting said front wheel drive power take-off shaft (6) to said front wheel drive power input shaft (10), and a second transmission shaft means (39) co-axially interconnecting said front working power take-off shaft (35) to said front working power input shaft (38) whereby said front wheel drive power input shaft (10) and said front wheel working power input shaft (38) are disposed below and parallel to either side of said drive pinion shaft (18), and said front wheel power output shaft (42) is disposed between shafts (10) and (38) so as to space said wheel power output shaft (42) as close as possible to said drive pinion shaft (18) so as to provide for maximum clearance between said drive gear case (8) and the ground.

2. For use in tractor type vehicles an improved front power take-off device as defined in claim 1 wherein said means (19 and 20) for drivingly connecting said front wheel power input shaft (10) to said drive pinion shaft (18) laterally overlap said means (47 and 48) drivingly connecting said front working power input shaft (38) to said front working power output shaft (42) and are longitudingly straggard relative to one another.

3. For use in a tractor type vehicle an improved front power take-off device as defined in claim 1 or 2 including a front working power take-off shaft (44), (66) coaxially connected to said front working power output shaft (42) whereby said front working power take-off shaft is closely spaced from said drive pinion shaft (18).

4. For use in a tractor type vehicle, an improved front power take-off device as defined in claim 3 and including an upper working power take-off shaft (69), said upper working power take-off shaft being spaced above and parallel to said front working power take-off shaft (44) and drive means (68) drivingly connecting said upper take-off shaft (69) to said front working power ftake-off shaft (66).

* * * * *